(12) United States Patent
Handfield

(10) Patent No.: US 11,952,224 B2
(45) Date of Patent: Apr. 9, 2024

(54) PNEUMATIC CONVEYING VENTURI FOR FLAKE ICE

(71) Applicant: Louis Handfield, Quebec (CA)

(72) Inventor: Louis Handfield, Quebec (CA)

( * ) Notice: Subject to any disclaimer, the term of this patent is extended or adjusted under 35 U.S.C. 154(b) by 0 days.

(21) Appl. No.: 17/939,013

(22) Filed: Sep. 7, 2022

(65) Prior Publication Data

US 2023/0271794 A1    Aug. 31, 2023

Related U.S. Application Data

(60) Provisional application No. 63/251,658, filed on Oct. 3, 2021.

(51) Int. Cl.
| | | |
|---|---|---|
| B65G 53/14 | (2006.01) | |
| B65G 53/50 | (2006.01) | |
| F25C 5/20 | (2018.01) | |

(52) U.S. Cl.
CPC ............. B65G 53/14 (2013.01); B65G 53/50 (2013.01); F25C 5/20 (2018.01)

(58) Field of Classification Search
None
See application file for complete search history.

(56) References Cited

U.S. PATENT DOCUMENTS

| | | | | |
|---|---|---|---|---|
| 140,017 A * | 6/1873 | Cram | ..................... | B65G 53/14 451/99 |
| 632,829 A * | 9/1899 | Berry | ..................... | B65G 53/14 406/144 |
| 634,119 A * | 10/1899 | Moore | ................... | B65G 53/14 406/144 |
| 998,762 A * | 7/1911 | Faller | ..................... | B28C 5/026 261/DIG. 26 |
| 1,020,962 A * | 3/1912 | Cable | ..................... | B65G 53/00 406/92 |
| 1,096,623 A * | 5/1914 | Girtanner | ............... | B65G 53/14 406/92 |
| 1,191,001 A * | 7/1916 | Hartpence | .............. | B65G 53/08 406/56 |
| 1,908,220 A * | 5/1933 | Chapman | ............... | B65G 53/30 406/92 |
| 2,794,686 A * | 6/1957 | Anselman | .............. | B65G 53/58 406/137 |
| 3,010,766 A * | 11/1961 | Coski | ..................... | B65G 53/00 406/106 |
| 3,206,255 A * | 9/1965 | Gray | ..................... | B65G 53/00 406/93 |
| 3,504,945 A * | 4/1970 | Leibundgut | ........... | B05C 19/002 406/127 |
| 3,512,841 A * | 5/1970 | Kollasch | ................ | B65G 53/00 406/137 |

(Continued)

*Primary Examiner* — Joseph A Dillon, Jr.

(57) ABSTRACT

The particularity of this invention is that the material is injected in the divergent section of the venturi.

The innovative material Conveying Venturi tube consist of two parts: the main tube and the feeding tube injecting the material by gravity, at the end of the cylindrical throat into the diffusion section. The venturi is composed of a contraction section, a throat section, and a diffusion section.

This device will convey distances exceeding 120 meters. The present invention permits multiple distances conveying by easily install another Conveying Venturi System at the end of the first conveying tube for extra length of conveying.

8 Claims, 2 Drawing Sheets

(56) References Cited

U.S. PATENT DOCUMENTS

| | | | | |
|---|---|---|---|---|
| 3,664,354 A * | 5/1972 | Minbiole, Jr. | B65G 49/0495 | 118/62 |
| 3,767,268 A * | 10/1973 | Stucky | B65G 53/00 | 119/844 |
| 4,010,551 A * | 3/1977 | Rohde | F26B 17/103 | 34/576 |
| 4,111,492 A * | 9/1978 | Mraz | B65G 53/40 | 222/144.5 |
| 4,340,347 A * | 7/1982 | Robertson | B29B 17/0005 | 264/37.32 |
| 4,462,722 A * | 7/1984 | Reba | D21F 7/006 | 55/319 |
| 5,002,092 A * | 3/1991 | Oirschot | B65G 53/58 | 417/183 |
| 5,156,102 A * | 10/1992 | Andersen | A01C 7/081 | 111/178 |
| 5,238,154 A * | 8/1993 | Zuriel | E01H 1/001 | 406/146 |
| 5,429,156 A * | 7/1995 | Ueda | B65G 53/58 | 406/92 |
| 5,816,509 A * | 10/1998 | Ahn | B05B 7/1404 | 241/58 |
| 5,836,514 A * | 11/1998 | Handfield | F25C 3/04 | 239/14.2 |
| 5,899,641 A * | 5/1999 | Pfeiffer | B65G 53/14 | 406/144 |
| 5,908,032 A * | 6/1999 | Poindexter | A24B 3/182 | 406/173 |
| 6,200,071 B1 * | 3/2001 | Karasawa | B65G 53/521 | 406/92 |
| 6,254,315 B1 * | 7/2001 | Pfeiffer | B65G 53/14 | 406/117 |
| 6,278,909 B1 * | 8/2001 | Thibeault | G05D 23/1904 | 700/286 |
| 6,325,572 B1 * | 12/2001 | Dietrich | B65G 53/60 | 406/146 |
| 6,345,936 B2 * | 2/2002 | Pfeiffer | B65G 53/14 | 406/197 |
| 6,749,374 B1 * | 6/2004 | Lane | B65G 53/58 | 406/92 |
| 6,974,279 B2 * | 12/2005 | Morohashi | B65G 53/14 | 406/173 |
| 7,021,870 B2 * | 4/2006 | Gille | B65G 53/50 | 406/93 |
| 7,270,249 B1 * | 9/2007 | Burkhead | G05D 7/0605 | 406/92 |
| 7,311,474 B1 * | 12/2007 | Ogasahara | B65G 53/14 | 406/146 |
| 8,936,416 B2 * | 1/2015 | Stutz, Jr. | B24C 9/00 | 406/137 |
| 9,546,051 B2 * | 1/2017 | Roberge | A01C 7/082 | |
| 9,555,438 B2 * | 1/2017 | Clark | B65G 53/50 | |
| 9,587,587 B2 * | 3/2017 | Foege | F15D 1/14 | |
| 9,944,473 B2 * | 4/2018 | Bent | A01C 14/00 | |
| 11,092,373 B2 * | 8/2021 | Handfield | B65G 53/14 | |
| 11,130,100 B1 * | 9/2021 | Berg | B01F 25/312511 | |
| 2001/0028830 A1 * | 10/2001 | Pfeiffer | B65G 53/14 | 406/154 |
| 2001/0041103 A1 * | 11/2001 | Pfeiffer | B65G 53/14 | 406/144 |
| 2003/0133759 A1 * | 7/2003 | Winther | A01C 7/082 | 406/138 |
| 2004/0042857 A1 * | 3/2004 | DeHart | B65G 53/14 | 406/194 |
| 2013/0105526 A1 * | 5/2013 | Ross | B29B 13/022 | 222/630 |
| 2013/0145573 A1 * | 6/2013 | Bizhanzadeh | B65G 53/26 | 15/300.1 |
| 2014/0328634 A1 * | 11/2014 | Beomonte Zobel | B65G 53/24 | 406/108 |
| 2022/0177239 A1 * | 6/2022 | Walker | B65G 53/24 | |

* cited by examiner

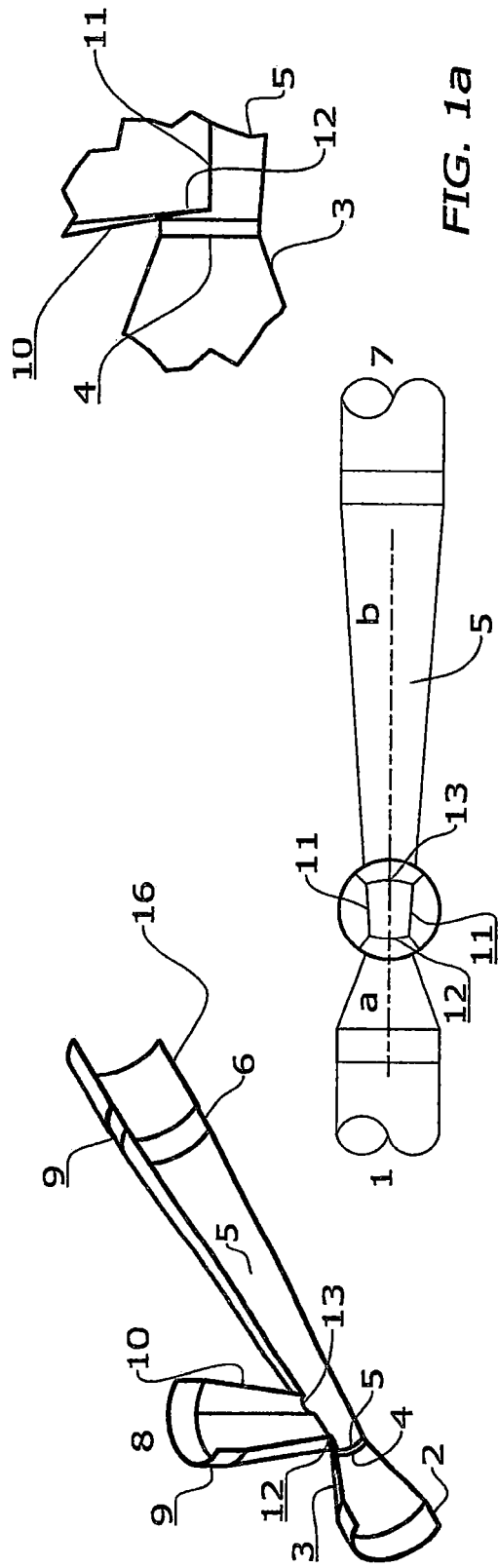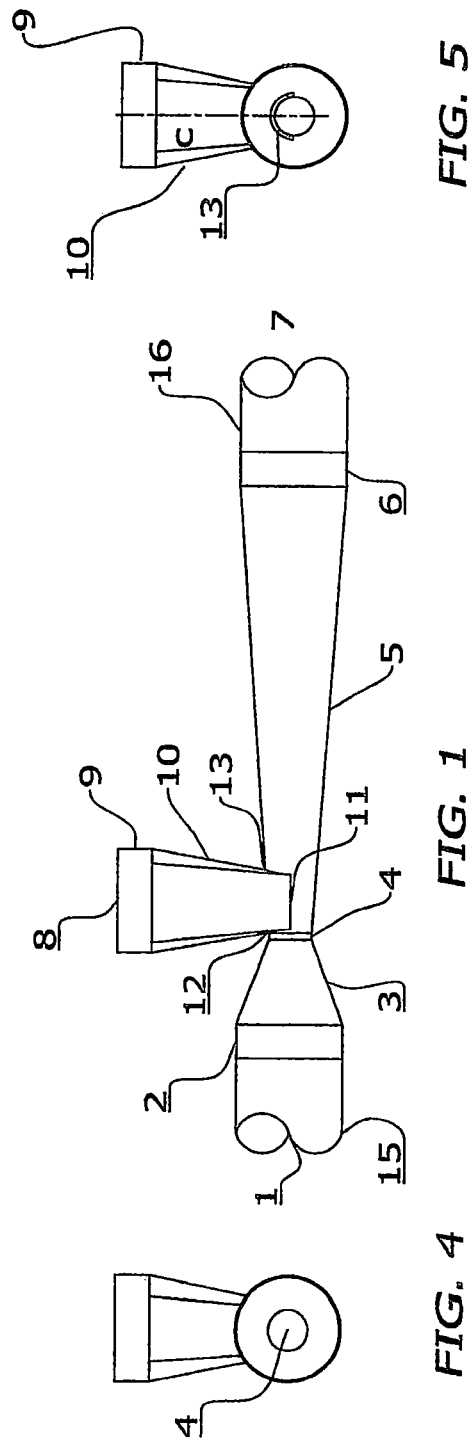

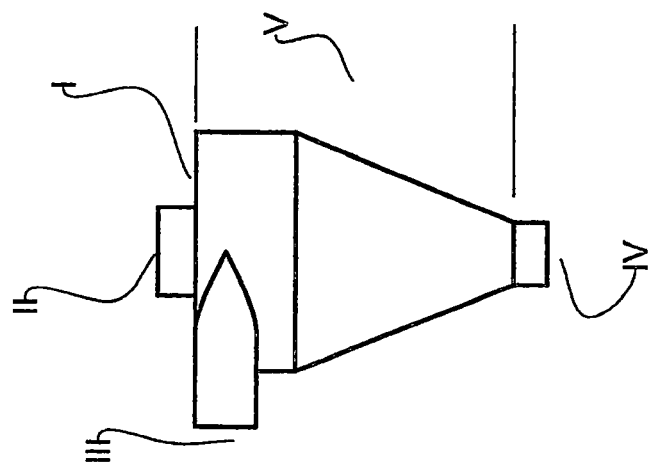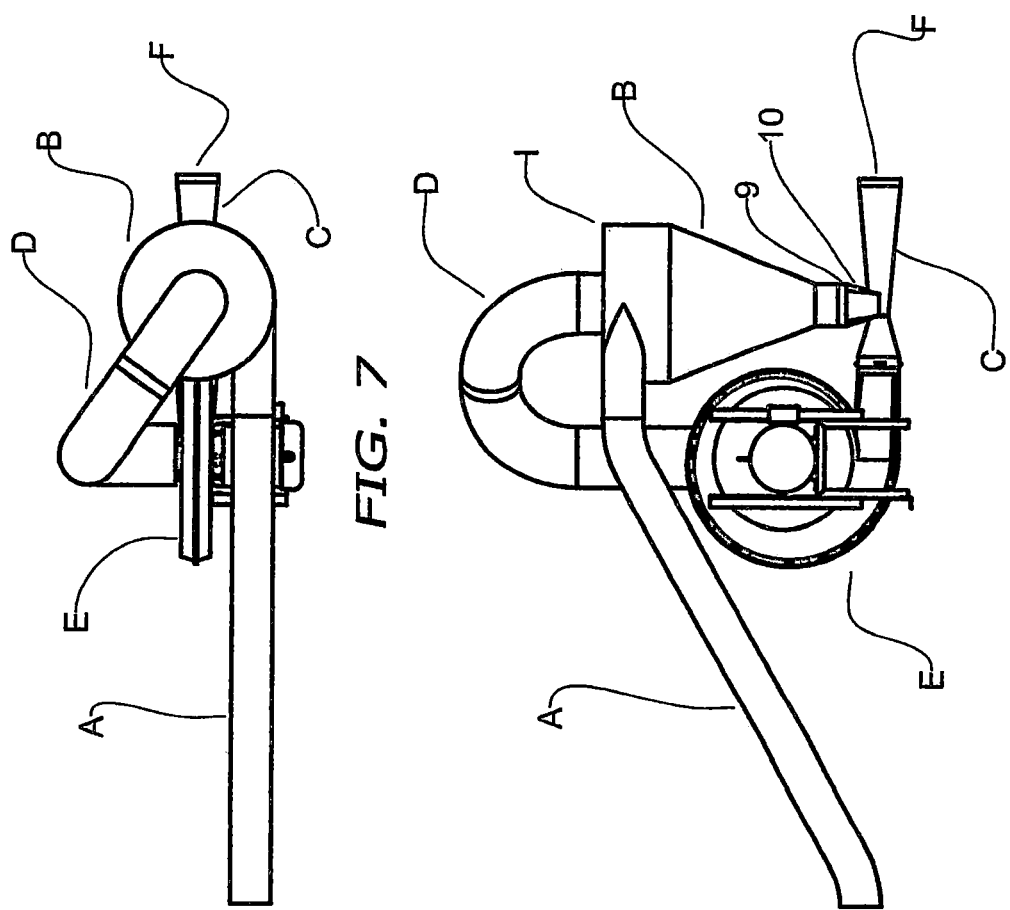

PNEUMATIC CONVEYING VENTURI FOR FLAKE ICE

FIELD OF THE INVENTION

This invention relates to an economic pneumatic conveying venturi apparatus for use in conveying flake ice (material). The particularity of this invention is that the material is injected in the divergent section of the venturi.

PRIOR ART TO RELATED PATENTS

Rotary valves pneumatic conveying system: Rotary valves are used almost universally in pneumatic conveying systems for long distances, where the operating temperature can exceed ambient by more than 30° C. for conveying flake ice. Rotary valves systems produce pulsating conveying. There is no venturi in this conveying system.

The word venturi is often referred from outside of its scientific definition.
  a. The venturi tube scientific definition of which the cross-section contract firstly and then gradually expands, is composed of a contraction section, a throat section and a diffusion section.
  b. Venturi Eductor: Venturi eductors are also known as Ejectors, Injectors, Jet Pumps and Venturi Pumps. These devices use the venturi principle to entrain low pressure air with high pressure air stream that transport powders, pellets, and granular material. This entrains the low-pressure air that contains the product and creates suction. The product feed occurs before the venturi throat.
  c. Inline venturi systems: Unlike conventional Venturi systems, Inline Venturi systems offers improved suction allowing materials to enter directly into the piping. The in-line venturi vacuum generators feature an air-supply port and vacuum port on the same axis. The Inline Venturi system has been designed to produce maximum suction in the line and at the material pick up point. This is achieved by placing the Inline venturi as close as possible to the discharge point of the conveying material. Conveying distances are limited to most of the time 30 m. The product feed occurs before the venturi throat.
  d. Inline Forced Venturi System: To increase conveying distance to over 100 m, volume of air must be reduced by reducing the suction air volume to its minimum. Instead, a mechanical device is injecting with velocity the material in the Eductor. See patent US Conveying Assembly for Flake icemaking Apparatus US 20190078825 A 1 Louis Handfield. This method permits distances of 100 meters. The purpose is not to inject the material by suction for short distance but to increase the conveying of the material to longer distances of more than 100 m with less volume of air. The product feed occurs before the venturi throat.

BACKGROUND OF THE INVENTION

Once the ice is produced and/or stored, it may need to be delivered to remote icing stations or other use points. Pneumatic delivery systems are most economic when conveying distances exceed 45 meters. This device will convey distances exceeding 120 meters. The term "flake ice" shall be used throughout the specification to include flake ice, instant snow, powered flake ice, ice crystals, materials and the like.

The conveying air temperature in a pneumatic conveying system can adversely affect the conveying material. To convey on long distances flake ice in a pressurized system, you must reduce the air temperature. Flake ice is usually dry, but in slurry or paste form typically aren't suited to pneumatic conveying. Distance conveying is also affected (reduced) by high volumes of air that creates friction. Cooling the motive air may be necessary. This venturi conveying shall be round or tubular to permit adequate mixture of the material with the motive air and avoid sticking flake ice into angles of square or rectangular shape of conduit.

SUMMARY OF THE INVENTION

The proposed simplified Venturi Tube includes two parts: a) the main tube and b) the feeding tube, the feeding tube located at the end of the cylindrical throat into the divergent section.

The conveying efficiency is mainly impacted by the flow resistance. The flow resistance, which may weaken the conveying efficiency of the Venturi tube, is highly impacted by geometry parameters. It mainly reflects in velocity and pressure distribution of the flow field. The suction pressure inside the throat section is relatively low.

The general dimensions related to the body of the cyclone so results can be applied generally are:
  a. the Contraction ratio (Y) between throat diameter and inlet tube diameter.
  b. the Throat ratio (m) between throat section length and the diameter of throat.
  c. the Contraction angle (a)
  d. the Diffusion angle (/3).
  e. the inlet and outlet pressure difference.
  f. the Flow ratio (q) presents the ratio of the suction flow (feeding) to the working flow (motive).
  g Diameter Flake Ice Inlet (d)
  h. Frustro-Conical. Angle (c)

The pressure decreases along the flow direction at the contraction section. An intensive change occurs at the intersection between the contraction and throat sections, where pressure reaches a minimum value. The pressure in the diffusion section increases along the flow direction. The difference between this minimum pressure and atmospheric is defined as a vacuum degree. Note that no variation of pressure occurs in the throat section.

We consider the pressure as an energy density. The fluid velocity passage through the narrowing of the venturi has its kinetic energy increased at the expense of pressure energy.

The transformations of energy are reversible or irreversible. The pressure loss is irreversible because the head loss is converted into heat. This occurs in the conveying pipe after the venturi and explain why we can attain the atmospheric ambient temperature after a certain distance in the tube.

The pressure generated by the change of velocity (dynamic pressure) is reversible: If for a given flow a converging cone accelerates the fluid, the pressure decreases (see Bernoulli), but with a diverging cone, positioned downstream, that slows down the fluid to its original speed, the balance of dynamic pressure is zero.

The mixing zone where the suction (feeding) flake ice low velocity enters the venturi very high velocity, there is pressure loss occurring and to maintain the energy of the throat section, it is better to locate the mixing zone at the beginning of the diffuser section.

The present invention is injecting the material by gravity into the divergent section of the venturi. Intensive pressure variation in the venturi tube occurs at the intersection between the contraction and the throat sections. It permits to optimize the low pressure and the high velocity of the motive air at the circular throat. The throat section creates near negative atmospheric pressure. No variation of pressure occurs in the throat section.

Subsequently, the pressure displays a continuous increment in the diffusion section. This specific way of material insertion with a small volume of secondary air into the beginning of the venturi divergent section, makes the fluid flow to appear in an asymmetric distribution (bifurcation phenomenon) to the bottom and provide easy insertion of the material. To avoid vortexes in the feeding tube, the distance of the feeding tube opening from the circular throat shall be considered.

Another advantage to have the mixing section in the diffuser section, is to permit a better contraction ratio Y that necessitate a smaller throat diameter. Mixing of high volume of flake ice material in a small diameter throat shall have not sufficient insertion space and shall reduce the capacity of that venturi. It shall also create backflow and clogging. Instead, insertion in the diffuser with expansion is preferable.

Pneumatic conveying is temperature driven and the temperature heat balance cannot be neglected. When the conveying air is mixed with the conveyed material, there is heat exchange to a mean mixture temperature at the pressure of the mixing zone. After 20-25 meters the air temperature of the mixture will reach ambient. The two parameters of interest in venturi feeders are the velocity and diameter at the throat area.

Ice has to be cold enough to re-freeze its own melting water to achieve maximum useful ice The present invention permits multiple distances conveying by being easily installed for an extra length of conveying.

Disengagement: At the end of the conveying pipe the solids are removed from the gas stream The disengagement of the gas stream from the flake ice of the first unit can be:
  a. as an emission to the ambient air and the flake ice material falls on the ground or else.
  b. The mixture of motive air and flake ice is disengaging into a cyclone where the gas stream is exiting in the ambient air and where the flake ice is reingested into a secondary similar gravity venturi
  c. The cyclone exiting air is reinjected in the intake of a secondary motive air blower for the secondary gravity venturi which is picking up the separated flake ice for an extra length of piping. And so on.

The cyclone mentioned above shall be of the solid separator for large particles. General rules for cyclone design shall be respected as follow.

Cyclones are the principal type of gas-solids separator using centrifugal force. They are simple and inexpensive to fabricate and contains no moving parts.
  The gas enters the top chamber tangentially-spirals down to the apex of the conical section-moves upward in a second, smaller diameter counter-spiral, and exits at the top through a central vertical pipe.
  The solids move radially to the walls, slide down the walls, and are collected at the bottom.
  Inlet velocity=25 m/sec to 30 m/sec
  Prior art of using cyclone in pneumatic conveying to extend a secondary distance:
  Presently all systems use rotary valves to collect the separated material.

The general dimensions related to the body of the cyclone so results can be applied generally
See FIG. 7
Cyclone body dimensions related to body "I"=D
Diameter Gas Exit "II"=0.378×D
Diameter Inlet Pipe "III"=0.25×D
Diameter of Flake Ice Exit "IV"=0.332×D
Height of Cyclone "V"=1.49×D

BRIEF DESCRIPTION OF THE DRAWINGS

The invention is described in greater detail with reference to the accompanying s drawings, which illustrate a preferred embodiment of the invention and wherein:

FIG. 1: Is a side view of the conveying venturi of the present invention

FIG. 1a: Is a detail view of FIG. 1 showing the cylindrical throat

FIG. 2: is a top view of the conveying venturi

FIG. 3: is an isometric section view of the conveying venturi

FIG. 4: is a left end view

FIG. 5: is a right view

FIG. 6: is a general side view with a cyclone separator permitting to reintroduce the flake ice in a secondary venturi c/w a blower for the motive air taken either from ambient air or reusing the disposition of the motive gas stream FIG. 7: is a top view of the cyclone separator and second venturi c/w the second1s motive blower FIG. 8: is a side view of the cyclone dimensions related to the body.

DETAILED DESCRIPTION OF THE INVENTION

With reference to FIGS. 1 to 5, the venturi of the present invention forms part of a conveying system for flake ice (flake ice) material, to deliver. the product at distances. The venturi tube comprises a cylindrical inlet section 2, followed by a contraction entrance 3 into a cylindrical throat 4 and a divergent outlet section 5 followed by a circular outlet section 6. The motive air from a blower 1 is introduced in an injection tube 15 under pressure into the venturi at section 2 to be accelerated by the contraction section 3 to the throat section 4 of the venturi and expand in the divergent section 5. The high velocity of the motive air in the throat tube area 4 has the air pressure reduced slightly lower than the ambient pressure. (Bernoulli's Law).

The flake ice is introduced by gravity 8 into the cylindrical inlet section 9 followed by the frustro-conical input section 10, which is circumferential joined to the face edges of the venturi divergent tube 11, 12, 13—leaving a hollow section with the venturi FIG. 3. The frustro-cone circumferential 10 joint to the divergent cone 5 shall not overlap the throat diameter section at 12 and FIG. 2 15. The increased surface area at section 13 FIG. 1 and FIG. 5 in the divergent section provides an extra volume to permit easy material insertion in the high-speed motive flow and offering less chance to plugging.

Because of the low pressure at the point of entry 4_4a. only a small volume of air is introduced by the cylindrical inlet section 9. The mixture of expanding motive air and flake ice 11 is accelerated in the divergent section 14 and blown in the circular outlet 6, followed by circular transport tube 16 to a further long distance such as 100 to 120 meters.

Introducing the material (flake ice) in the divergent section provide a larger injection surface area of the divergent section 5 than in the circular throat small diameter 4. Being injected into the divergent section 5 of the venturi, it has a better way of being entrained without too much friction and energy. There are less chances of plugging in introducing the material into the system 11, 13.

Behavior of the motive air flow introduction at the beginning of the divergent section. The tendency of the high-speed fluid jet (around 159.7 m/sec (357 mph) attach the motive jet stream to the adjacent bottom of the divergent section to regain full section area of the divergent tube and exit tube 16 at about 2 meters (6.5 ft) from the throat of this venturi. This caused mainly by the gap suction opening FIG. 1 11 at plane X-X to create an asymmetric downward flow. Note this situation will exist by proper adjusting the converging section angle in order not to amplify the asymmetric effect jet attaching to the bottom part.

The pressure that has dropped and fluid velocity increased as the fluid flows through the contraction 3 is restored after the throat cylindrical section 4_4a to the preconstruction pressure by a gradual dilation in the divergent section 5 of angle less than 15°.

The present invention is in the Lean phase pneumatic conveying using high volume of air at low pressure<1.5 bar (<22 psi). The fan for the motive air must supply air velocities that are above 25 m/sec and better around 30 msec for 1:1 ratio. For a safety margin a velocity near 30 m/sec is good to avoid saltation.

The high velocity found at the point of flake ice insertion 11,13 may provide a degradation of flake ice but not a critical concern.

The construction specifications limits of this invention venturi are as follow:
  a. Related to Basic Diameter (FIG. 1 and FIG. 2) D=152.4 mm
  b. Contraction ratio (y) (FIG. 1 4) 0.5<y>0.35 ex: y=0.4
  c. Throat ratio (m) 0.1>m<1.0 ex: m=0.1639
  d. Contraction angle ($\alpha$) 15°>$\alpha$<30° ex: $\alpha$=20°
  e. Diffusion angle ($\beta$) 2o>$\beta$<15° ex: $\beta$=4°
  f. Flow ratio (q)=+/−0.8697 of P1/P2
  g. Diameter of Flake Ice Inlet (d)=0.164>d<0.409 ex: d=0.266
  h. Frustro Conical Angle (c)=55°>c<75° ex: c=60°

This venturi invention could be built proportionally in standard tube sizes of D 1 & 6 of 100 mm (4 in) and 150 mm; 160 mm (6.3 in) 200 mm (8 in) etc. depending on material load and distance needed to convey.

Disengagement into a Cyclone Separator
  a) The air stream containing material (air-flake ice) from the conveying pipe A FIG. 6 & FIG. 1 enters the cyclone separator B at tangential angle and is spun rapidly, creating a circular flow that imparts centrifugal force to the particles which strike the wall of the cyclone and fall through a bottom to be discharged into a second venturi C FIG. 1 to redirect the flake ice into a conveying pipe F to another point.
  b) The disengagement of the gas stream from the flake ice of the first unit FIG. 6 D, can be as an emission to the ambient air or exhaust it in the intake of the secondary motive air blower FIG. 6 E of the secondary gravity venturi FIG. 1 & FIG. 6 C for an extra length of piping. A separate power supply for the motive air blower shall be use.
  c) Cyclone shall be paired with the venturi capacity. See FIG. 6 & FIG. 7
    Venturi Cyclone Body Diameter (I)=610 mm (24 in)
    Diameter Gas Exit (II)=0.377×I=225 mm (8.9 in)
    Diameter Inlet Pipe (III)=0.25×I=152.5 mm (6 in)
    Diameter of Flake Ice Exit (IV)=0.34×I=204 mm (8 in)
    Height of Cyclone (V)=1.31×I=790 mm (31 in)
  d) To improve the separation of the flake ice from the motive air, the diameter of the flake ice exit from the cyclone may have to be adjusted to obtain the maximum efficiency. The Diameter of the Flake Ice inlet FIG. 5 & FIG. 6 9 and the Frustro-Conical angle FIG. 5 & FIG. 6 10 for the secondary Venturi can easily be adjusted for the need. The same could apply for the primary venturi for space concern.
  e) This method shall be of less cost than providing a flake ice production plant at distance.

The invention claimed is:

1. A long-distance pneumatic conveyor for conveying flake ice having a converging-diverging conduit forming a venturi;
  said venturi comprising a bulk material inlet, a motive air inlet, and an outlet;
  said motive air inlet having a cylindrical first section followed in a conveyance direction by a converging conic section;
  said outlet having a conic section diverging in the conveyance direction followed by cylindrical second section;
  said venturi having a throat between the conic sections;
  said bulk material inlet having a first bulk material cylindrical section leading to a converging polygonal section dropping and aspirating bulk material into a downstream end of the throat along a longitudinal conduit axis.

2. The conveyor of claim 1, wherein the ratio of a throat diameter to a first section diameter is between 0.5 and 0.35.

3. The conveyor of claim 1, wherein the ratio of a throat length to a throat diameter is between 0.01 and 1.0.

4. The conveyor of claim 1, wherein a Contraction angle is between 15 and 30 degrees.

5. The conveyor of claim 4, wherein a Diffusion angle is between 2 and 15 degrees.

6. The conveyor of claim 1, wherein conveyed flake ice falls into a collecting bin from motive air separation in a cyclone separator.

7. The conveyor of claim 1, wherein motive air is separated from bulk material in a cyclone separator then fed into a second venturi.

8. The conveyor of claim 1, the converging polygonal section has an angle between 55 and 75 degrees.

* * * * *